May 31, 1960   W. H. SILVER ET AL   2,938,587
TWO-WAY PLOW WITH IMPROVED BRACKET FOR THE STANDARDS
Filed May 8, 1957   2 Sheets-Sheet 1

INVENTORS.
WALTER H. SILVER
WILLIAM V. LOHRMAN
BY
C. T. Parker  R. C. Johnson
ATTORNEYS May 31, 1960  W. H. SILVER ET AL  2,938,587
TWO-WAY PLOW WITH IMPROVED BRACKET FOR THE STANDARDS
Filed May 8, 1957  2 Sheets-Sheet 2

INVENTORS.
WALTER H. SILVER
WILLIAM V. LOHRMAN

ATTORNEYS

大专利 Office 2,938,587
Patented May 31, 1960

2,938,587

TWO-WAY PLOW WITH IMPROVED BRACKET FOR THE STANDARDS

Walter H. Silver, Moline, Ill., and William V. Lohrman, Davenport, Iowa, assignors, by mesne assignments, to Deere & Company, a corporation of Delaware Filed May 8, 1957, Ser. No. 657,877

6 Claims. (Cl. 172—224)

This invention relates generally to agricultural implements and more particularly to a two-way plow with improved bracket for the standards.

The object and general nature of the present invention is the provision of new and improved means connecting the plow standards of a two-way plow to the associated part which is actuated to shift the plows from a right hand plowing position to a left hand plowing position and vice versa. More specifically, it is a feature of this invention to provide plow standard connecting means, accommodating easily and conveniently made landing adjustments, whereby the width of cut may be varied as desired. Further, it is a feature of this invention to provide new and improved means whereby the plow standard receiving bracket is rigidly and positively connected with the part that is rocked from one position to the other when reversing the plows.

These and other objects and advantages of the present invention will be apparent to those skilled in the art after a consideration of the following detailed description of the preferred structure in which the principles of this invention have been incorporated.

Figure 1:
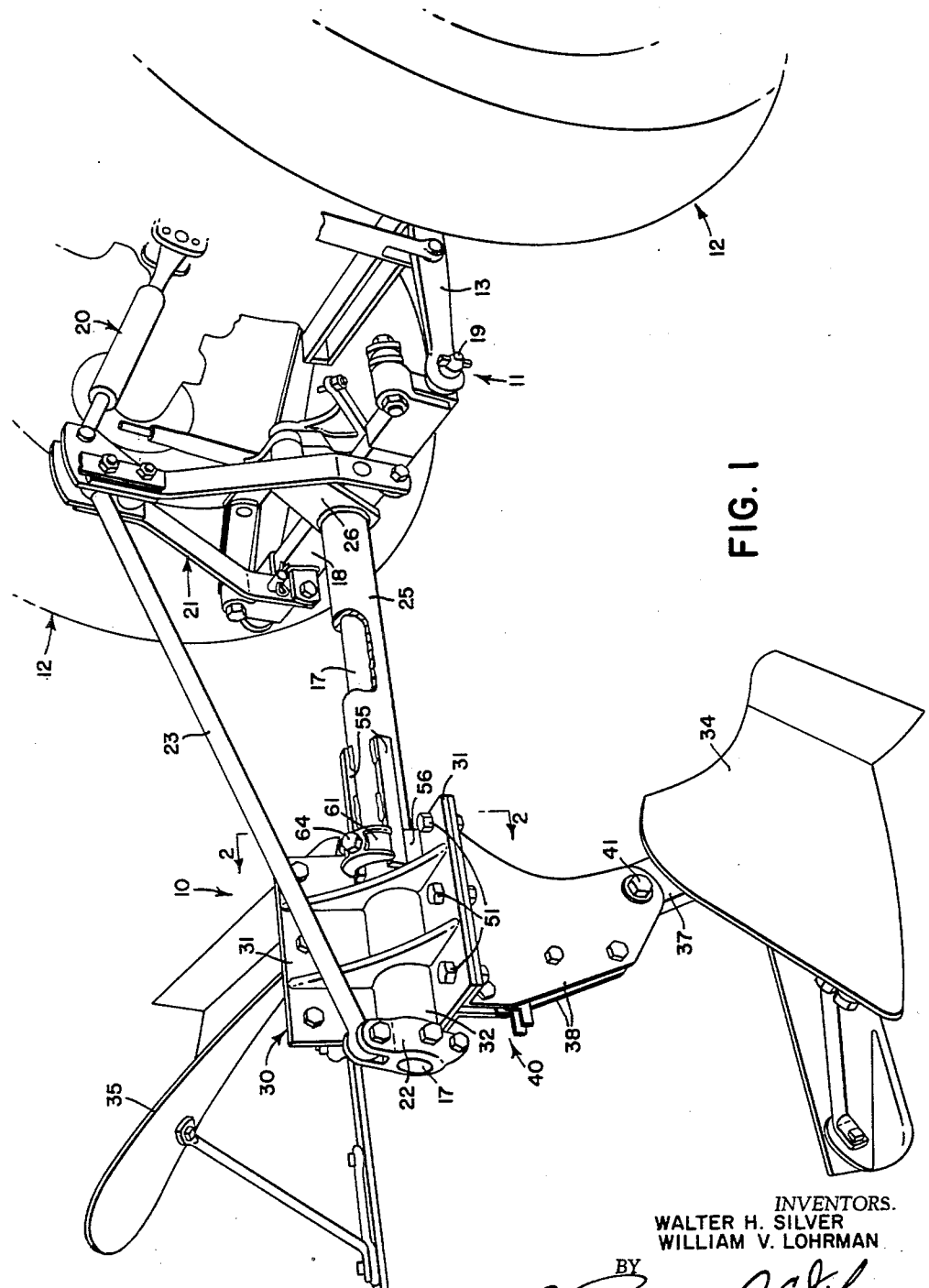
Fig. 1 is a fragmentary perspective of a tractor mounted two-way plow in which the principles of this invention have been incorporated.

The implement in which the present invention has been incorporated is indicated in its entirety by the reference numeral 10 and is shown as adapted to be connected by three-point hitch means 11 to a conventional farm tractor 12 of the type having lower draft links 13. The main frame of the implement includes a generally fore-and-aft extending support, such as a bar or shaft 17, and a transverse bar 18 secured rigidly to the bar or shaft 17. The laterally outer ends of the front bar 18 are reduced so as to form studs 19 releasably receiving the rear ends of the draft links 13, preferably through ball joint connectors or the like. Also secured rigidly to the transverse bar 18 is a generally vertically extending mast section 21 to which the upper link means 20 of the hitch structure 11 is adapted to be connected. The rear end of the fore-and-aft extending frame bar or support 17 carries a collar 22, and a brace bar 23 is connected between the collar 22 and the upper portion of the mast section 21.

Rockably mounted on the forward portion of the bar or support 17 is a sleeve member 25. The forward end of this member carries an arm 26 rigidly secured thereto. This arm is connected with associated mechanism (not shown) by which the sleeve 25 is rocked about a fore-and-aft extending axis from one position to another when the implement 10 is raised by the tractor power lift. The present invention is not especially concerned with the particular details of the operating mechanism for rocking the sleeve 25.

A plow standard receiving bracket 30 is rockably mounted on the rear portion of the bar 17 and preferably is in the form of a casting having wing sections 31 arranged at an angle to one another. This angle is about 100° in one operative embodiment of this invention. The wing sections 31 extend angularly from a generally central tubular portion 32 that is rockable on the rear end of the bar 17 just ahead of the collar 22. The implement 10 includes a right hand plow bottom 34 and a left hand plow bottom 35. Each is connected with the associated bracket 30 by means of a standard 37 and a pair of bracket plates 38 that at their upper ends carry outwardly extending flanges 39, each standard 37 thereby having a pair of flanges 39 disposed in a common plane. Suitable trip mechanism, indicated generally at 40, which does not form any part of the present invention, is disposed between the bracket plates 38 and releasably locks the upper end of the standard 37 in position between the plates 38. Each standard 37 is pivoted, as at 41, to the lower ends of the associated plates 38.

Figure 3:
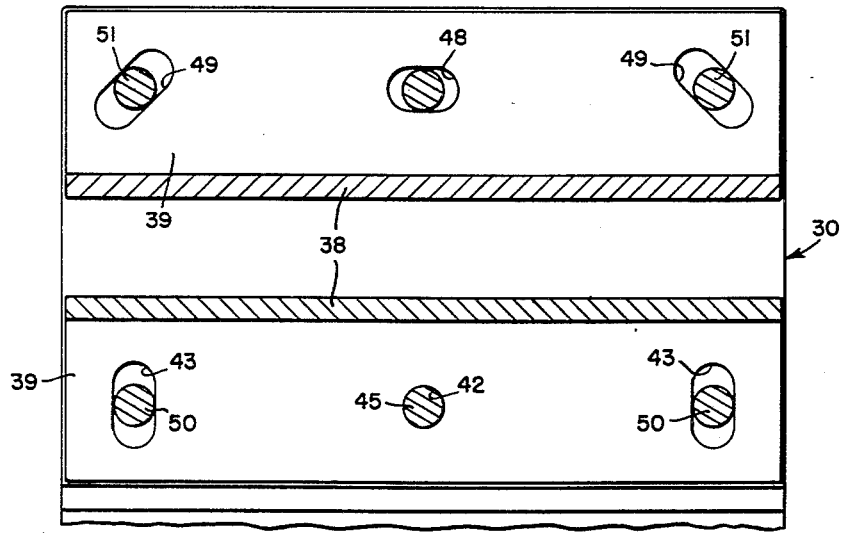
Fig. 3 is a sectional view taken along the line 3—3 of Fig. 2.
Figure 2:
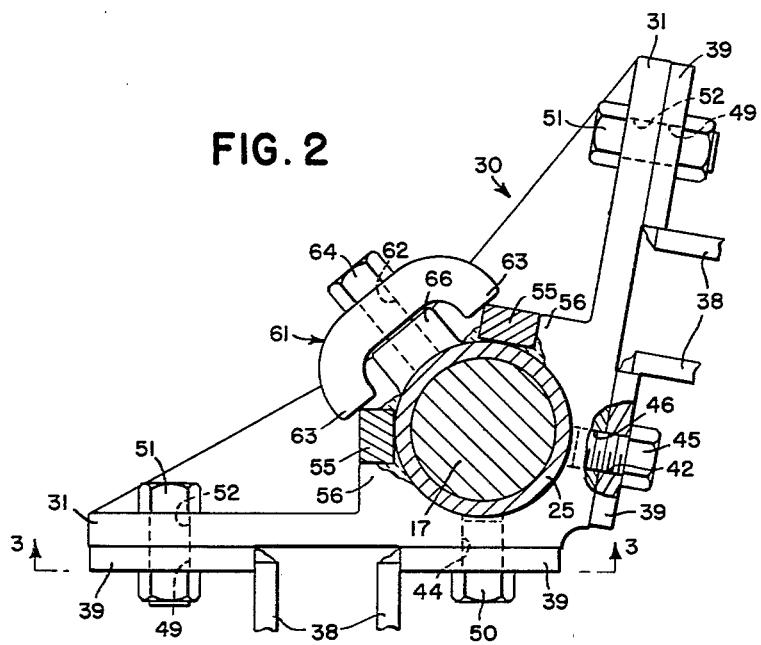
Fig. 2 is a sectional view taken generally along the line 2—2 of Fig. 1.

Each standard 37 is connected with the associated wing sections 31 by means that provides for adjusting the angular position of the associated plow bottom 34 relative to the bracket 30 about a generally vertical axis when that plow bottom is in operating position. This adjustment is known as a width of cut or landing adjustment. As can best be seen in Fig. 3, the inner flange 39 is provided with a central opening 42 and a pair of end slots 43. The central opening 42 is adapted to receive a pivot 45, preferably in the form of a cap screw or the like, that is threaded into a generally central opening 46 tapped into the central portion of the tubular sections 32 of the bracket 30. The tubular section of the bracket 30 is also provided with a pair of end tapped openings 44 to receive cap screws 50 that extend upwardly through the slots 43 in the inner flange 39. The outer flange 39 is provided with a central slot 48 and a pair of diagonally disposed end slots 49. The slots 48 and 49 are so disposed as to be approximately arcuate with respect to the pivot 45 and bolts 51 extend through openings 52 in the associated wing section 31 and the slots 48 and 49 so as to firmly and rigidly fix the laterally outer flange 39 to the associated wing sections 31 of the bracket 30.

By loosening the cap screws 42 and 50 extending through the inner flange 39 and the bolts 51 extending through the outer flange 39, the right hand plow bottom 34 and associated standard, when positioned as shown in Fig. 1, may be adjusted about a generally vertical axis so as to change the width of cut. The plow standard is then securely fixed to the bracket 31 by tightening the screws and the bolts just mentioned. The letf hand plow bottom 35 and its associated standard is fixed to the left hand wing section 31 in the same manner just described and landing adjustment for the left hand bottom is effected in the same way.

According to the principles of this invention, new and improved means is provided for connecting the plow standard bracket 30 to the rear end of the sleeve so that whenever the latter is rocked the plows are also turned from one position to the other. Such connecting means will now be described. A pair of bars 55 are disposed longitudinally of the sleeve and are fixed, as by welding, to the rear portion of the sleeve 25 so that the rear ends of the bars 55 extend rearwardly in overlapping relation relative to the forward portion of the bracket 30. The rear ends of the bars 55 are received between a pair of abutment shoulders 56 carried by the forward portion of the plow standard bracket 30, the sections 56 being spaced apart substantially the same as the distance between the laterally outer surfaces of the bars 55. However, due to permissive manufacturing tolerances or the like, it is not always possible to have the rear end of the bars 55 fit snugly between the abutment sections 56. Occasionally there is a slight looseness or clearance at this point, and in order to eliminate any clearance or looseness, the present invention contemplates the provision of a clamping means that acts against the rear ends of the bars 55 and, relying upon a slight resilience in the extending end portions of the bars, such clamping means acts to firmly and rigidly connect the bracket 30 to the rockable sleeve 25. According to this invention, the aforesaid clamping or locking means includes a generally U-shaped cap member 61 having a generally central opening 62 and end sections 63, the latter being engageable with the adjacent portions of the rear ends of the bars 55. A cap screw 64 is disposed in the opening 62 and is threaded into a tapped boss 66 on the forward portion of the bracket 30, preferably midway between the wing sections 31. When the cap screw 64 is tightened, the locking or clamping member 64 deflects to some slight extent the rear ends of the bars 55 and forces them into tight contact with the associated abutment sections 56. By virtue of this construction, there is no looseness between the bracket 31 and the sleeve 25, and this is true even though there may at times be some deflection in the support bar 17 and/or associated parts when, for example, plowing under difficult conditions.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. In a two-way plow including a rockable beam structure having a generally fore-and-aft extending relatively stationary bar on which a sleeve member is rockable, said bar extending rearwardly of said sleeve member, the combination therewith of a pair of bars fixed to said rockable sleeve member and extending longitudinally of said sleeve member and rearwardly of the rear end thereof, a bracket rockably mounted on said bar rearwardly of the rear end of said sleeve member, plow standards connected in angular relationship to said bracket, and a pair of shoulders adjacent the forward portion thereof spaced apart so as to receive the rear portions of said bars, whereby said bracket and standards are rocked on said bar by the rocking of said sleeve member.

2. The invention set forth in claim 1, further characterized by means on said bracket engaging said bars for clamping them against said shoulders.

3. In a two-way plow, a supporting bar, a rockable sleeve thereon, a pair of bars fixed at their forward ends to said sleeve and extending rearwardly past the rear end thereof, a bracket rockable on said bar at the rear end of said sleeve and receiving the rear portions of said bars, and means clamping the rear end portions of said bars to said bracket.

4. In a two-way plow, a generally fore-and-aft extending support, a sleeve rockably disposed on the forward portion of said support, a pair of bars fixed to said sleeve and extending rearwardly therefrom, the extending portions of said bars having some resilience, a plow standard bracket rockably mounted on said support at the rear end of said sleeve and having abutment shoulders adjacent the rear ends of said bars, and means on said bracket engageable with said bar ends for clamping the latter against said abutment shoulders, said resilience of the bars accommodating variations in the spacing between said abutment shoulders.

5. In a two-way plow, a supporting bar, a rockable sleeve thereon, said bar extending rearwardly of said sleeve, a pair of bars fixed at their forward ends to said sleeve and extending from the rear end thereof, a bracket rockable on said bar at the rear end of said sleeve and having a pair of spaced apart bar-receiving surfaces, and a locking part engaging the end portions of said bars carried by said bracket for clamping said bars against said surfaces.

6. In a two-way plow, a supporting bar, a rockable sleeve thereon, a pair of bars fixed at their forward ends to said sleeve and extending rearwardly from the rear end thereof in spaced relation with respect to the rear portion of said bar, a bracket rockable on said bar at the rear end of said sleeve and having a pair of angularly disposed wing sections and a generally central section disposable about said bar and generally under the rear portions of said pair of bars, a plow standard fixed to each wing section and each standard carrying a plow, bar-receiving means carried by said central bracket section of said bracket generally midway between said wing sections, and means clamping the rear end portions of said bars against said bar-receiving means.

References Cited in the file of this patent

UNITED STATES PATENTS

| 532,332 | Morrison | Jan. 8, 1895 |
| 1,076,001 | Butterfield | Oct. 14, 1913 |
| 2,304,383 | Strandlund | Dec. 8, 1942 |
| 2,430,434 | Rutter | Nov. 4, 1947 |
| 2,609,740 | Dexheimer et al. | Sept. 9, 1952 |